US012641666B2

(12) United States Patent
Chen

(10) Patent No.: US 12,641,666 B2
(45) Date of Patent: May 26, 2026

(54) REFERENCE SIGNAL CONFIGURATION METHOD AND APPARATUS, AND TERMINAL

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 334 days.

(21) Appl. No.: 18/331,767

(22) Filed: Jun. 8, 2023

(65) Prior Publication Data

US 2023/0337315 A1      Oct. 19, 2023

Related U.S. Application Data

(63) Continuation of application No. PCT/CN2021/142823, filed on Dec. 30, 2021.

(30) Foreign Application Priority Data

Dec. 31, 2020    (CN) .......................... 202011642267.2

(51) Int. Cl.
*H04W 76/20* (2018.01)
*H04L 5/00* (2006.01)
*H04W 68/02* (2009.01)

(52) U.S. Cl.
CPC ........... *H04W 76/20* (2018.02); *H04L 5/0051* (2013.01); *H04W 68/02* (2013.01)

(58) Field of Classification Search
CPC ..... H04W 76/20; H04W 68/02; H04W 76/19; H04W 76/11; H04W 76/27; H04W 76/26;

H04W 76/28; H04W 76/32; H04W 72/04; H04W 72/21; H04W 72/23; H04W 72/00; H04W 8/18; H04W 8/24; H04W 24/08; H04W 24/10; H04L 5/00; H04L 27/26

(Continued)

(56) References Cited

U.S. PATENT DOCUMENTS

| | | | | |
|---|---|---|---|---|
| 11,096,079 B2* | 8/2021 | Zhang | ............... | H04W 52/0229 |
| 11,259,201 B2* | 2/2022 | Chen | .................... | H04L 5/0094 |

(Continued)

FOREIGN PATENT DOCUMENTS

| | | |
|---|---|---|
| CN | 110022197 A | 7/2019 |
| CN | 110035447 A | 7/2019 |

(Continued)

OTHER PUBLICATIONS

Second Office Action for Chinese Application No. 202011642267.2, dated Mar. 29, 2024, 8 Pages.

(Continued)

*Primary Examiner* — Man U Phan
(74) *Attorney, Agent, or Firm* — BROOKS KUSHMAN P.C.

(57) ABSTRACT

This application discloses a reference signal configuration method and apparatus and a terminal. The method includes: determining a first configuration of a first reference signal and/or a first configuration state of the first configuration when the terminal is in an idle or inactive state, where the first configuration state includes at least one of the following: valid, available, activated, invalid, unavailable, and deactivated.

16 Claims, 4 Drawing Sheets

S501

Determine a first configuration of a first reference signal and/or a first configuration state of the first configuration when a terminal is in an idle or inactive state

S502

The first configuration state of the first configuration becomes effective when the terminal is released to an idle state or suspended to an inactive state

(58) Field of Classification Search
USPC ........................................................ 370/329
See application file for complete search history.

(56) References Cited

U.S. PATENT DOCUMENTS

| | | | | |
|---|---|---|---|---|
| 11,463,927 B2 * | 10/2022 | Da Silva | ........... | H04W 74/0833 |
| 11,637,670 B2 * | 4/2023 | Lin | ....................... | H04L 5/0048 |
| | | | | 370/335 |
| 11,665,571 B2 * | 5/2023 | Chen | .................... | H04W 76/27 |
| | | | | 370/252 |
| 11,930,481 B2 * | 3/2024 | Oh | .................... | H04W 72/0453 |
| 12,028,870 B2 * | 7/2024 | Xu | ........................ | H04L 5/0048 |
| 12,096,488 B2 * | 9/2024 | Xu | ........................ | H04W 68/02 |
| 12,133,193 B2 * | 10/2024 | Si | ............................ | H04W 8/08 |
| 12,267,269 B2 * | 4/2025 | Chen | .................... | H04L 5/0051 |
| 12,328,670 B2 * | 6/2025 | Maleki | ................. | H04L 5/0048 |
| 2016/0295634 A1 | 10/2016 | Miao et al. | | |
| 2018/0167921 A1 | 6/2018 | Liu et al. | | |
| 2018/0262937 A1 | 9/2018 | Lee et al. | | |
| 2020/0137602 A1 | 4/2020 | Zhang et al. | | |
| 2021/0067994 A1 | 3/2021 | Chen | | |
| 2021/0120447 A1 | 4/2021 | Zhou et al. | | |
| 2021/0204149 A1 | 7/2021 | Kimba Dit Adamou et al. | | |
| 2021/0218529 A1 * | 7/2021 | Nam | .................... | H04L 5/0091 |
| 2023/0032593 A1 * | 2/2023 | Chen | .................... | H04L 5/0051 |

FOREIGN PATENT DOCUMENTS

| | | | |
|---|---|---|---|
| CN | 110035567 A | 7/2019 |
| CN | 110650492 A | 1/2020 |
| CN | 110690947 A | 1/2020 |
| CN | 110943818 A | 3/2020 |
| EP | 3739939 A1 | 11/2020 |
| WO | 2013185512 A1 | 12/2013 |
| WO | 2019028849 A1 | 2/2019 |
| WO | 2020061994 A1 | 4/2020 |

OTHER PUBLICATIONS

Qualcomm Incorporated "TRS/CSI-RS for idle/inactive UE power saving" 3GPP TSG-RAN WG1 #103-e, e-Meeting, Oct. 2020, R1-2009267, 6 Pages.
Extended European Search Report for Application No. 21914589.3, dated May 24, 2024, 7 Pages.
First Office Action for Japanese Application No. 2023-538148, dated May 13, 2024, 5 Pages.
Huawei, HiSilicon "Assistance RS occasions for IDLE/inactive mode" 3GPP TSG RAN WG1 Meeting #103-e, E meeting, Oct. 2020, R1 2007601, 9 Pages.
CMCC "Discussion on TRS/CSI-RS occasion(s) for idle/inactive-mode UEs" 3GPP TSG RAN WG1 #103-e, e-Meeting, Oct. 2020, R1-2008022, 4 Pages.
LG Electronics "Discussion on TRS/CSI-RS occasion(s) for idle/inactive UEs" 3GPP TSG RAN WG1 #103-e, e-Meeting, Oct. 2020, R1-2008054, 5 Pages.
Samsung "Discussion on TRS/CSI-RS for idle/inactive UEs" 3GPP TSG RAN WG1 #103, e-Meeting, Oct. 2020, R1-2008176, 6 Pages.
Lenovo, Motorola Mobility "Paging enhancement for UE power saving" 3GPP TSG RAN WG1 Meeting #103-e, e-Meeting, Oct. 2020, R1-2009105, 4 Pages.
Lenovo, Motorola Mobility "Provision of TRS/CSI-RS for idle/inactive UEs" 3GPP TSG RAN WG1 Meeting #103-e, e-Meeting, Oct. 2020, R1-2009106, 6 Pages.
First Office Action for Chinese Application No. 202011642267.2, dated Sep. 27, 2023, 7 Pages.
Vivo "TRS/CSI-RS occasion(s) for idle/inactive UEs" 3GPP TSG RAN WG1 #103-e, e-Meeting, Nov. 2020, R1-2007674, 9 Pages.
International Search Report and Written Opinion for Application No. PCT /CN2021/142823, dated Mar. 30, 2022, 8 Pages.
First Indian Office Action for Indian Patent Application No. 202317045854 mailed Jul. 18, 2024. 6 pages.

* cited by examiner

S201

Determine a first configuration of a first reference signal and/or a first configuration state of the first configuration when a terminal is in an idle or inactive state, where the first configuration state includes at least one of the following: valid, available, activated, invalid, unavailable, and deactivated

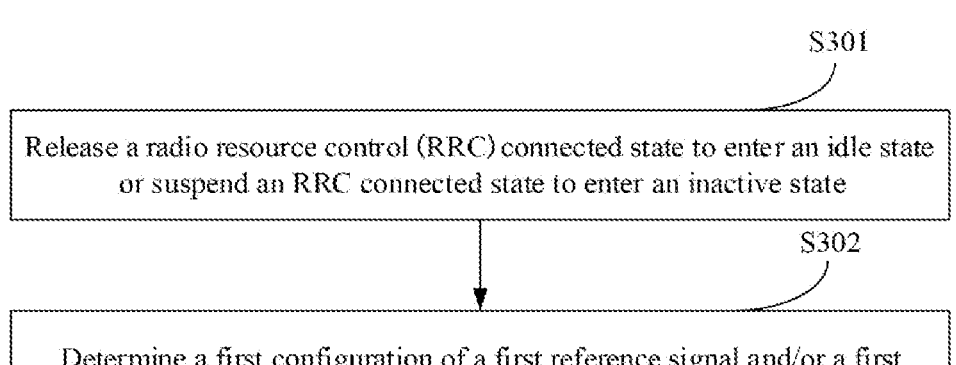

S301

Release a radio resource control (RRC) connected state to enter an idle state or suspend an RRC connected state to enter an inactive state

S302

Determine a first configuration of a first reference signal and/or a first configuration state of the first configuration when a terminal is in an idle or inactive state, according to at least one of the following target indications

Determine a first configuration of a first reference signal and/or a first configuration state of the first configuration when a terminal is in an idle or inactive state, where the first configuration state of the first configuration becomes effective upon receipt of the first configuration of the first reference signal

Determine a first configuration of a first reference signal and/or a first configuration state of the first configuration when a terminal is in an idle or inactive state

S502

The first configuration state of the first configuration becomes effective when the terminal is released to an idle state or suspended to an inactive state

FIG. 5

REFERENCE SIGNAL CONFIGURATION METHOD AND APPARATUS, AND TERMINAL

CROSS-REFERENCE TO RELATED APPLICATIONS

This application is a continuation of PCT International Application No. PCT/CN2021/142823 filed on Dec. 30, 2021, which claims priority to Chinese Patent Application No. 202011642267.2, filed on Dec. 31, 2020, which are incorporated in their entireties by reference herein.

TECHNICAL FIELD

This application pertains to the field of mobile communications technologies, and specifically, to a reference signal configuration method and apparatus, and a terminal.

BACKGROUND

In a 5G system, the channel state information reference signal (CSI-RS) is mainly for configuration and use of terminals (UE) in an RRC connected state.

For UE in an idle or inactive state, although CSI-RS can be configured for the idle/inactive-state terminal through system information, a paging message, or a radio resource control release (RRC release) or radio resource control suspend (RRC suspend) message, the configuration state of CSI-RS cannot be changed for the idle/inactive-state terminal. As a result, CSI-RS cannot be used for idle/inactive-state terminals.

SUMMARY

Embodiments of this application are intended to provide a reference signal configuration method and apparatus, and a terminal.

This application is implemented as follows:

According to a first aspect, a reference signal configuration method is provided, executed by a terminal, including:
determining a first configuration of a first reference signal and/or a first configuration state of the first configuration when the terminal is in an idle or inactive state, where the first configuration state includes at least one of the following: valid, available, activated, invalid, unavailable, and deactivated.

According to a second aspect, a reference signal configuration apparatus is provided, including:
a configuration module, configured to determine a first configuration of a first reference signal and/or a first configuration state of the first configuration when a terminal is in an idle or inactive state, where the first configuration state includes at least one of the following: valid, available, activated, invalid, unavailable, and deactivated.

According to a third aspect, a terminal is provided, including a processor, a memory, and a program or instructions stored in the memory and capable of running on the processor, and when the program or instructions are executed by the processor, the steps of the method according to the first aspect are implemented.

According to a fourth aspect, a readable storage medium is provided, where the readable storage medium stores a program or instructions, and when the program or instructions are executed by a processor, the steps of the method according to the first aspect is implemented.

According to a fifth aspect, a chip is provided, where the chip includes a processor and a communications interface, the communications interface is coupled to the processor, and the processor is configured to run a program or instructions to implement the method according to the first aspect.

According to a sixth aspect, a program/program product is provided, where the program/program product is stored in a non-transitory storage medium, and when the program/program product is executed by a processor, the method according to the first aspect is implemented.

BRIEF DESCRIPTION OF THE DRAWINGS

FIG. 3 is another schematic flowchart of a reference signal configuration method according to an embodiment of this application;

FIG. 4 is still another schematic flowchart of a reference signal configuration method according to an embodiment of this application;

FIG. 5 is yet still another schematic flowchart of a reference signal configuration method according to an embodiment of this application;

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first" and "second" are generally of a same type, and the quantities of the objects are not limited, for example, there may be one or more first objects. In addition, in this specification and claims, "and/or" indicates at least one of the connected objects, and the character "I" generally indicates an "or" relationship between the contextually associated objects.

It should be noted that the technologies described in the embodiments of this application are not limited to long term evolution (LTE)/LTE-advanced (LTE-A) systems, but may also be used in other wireless communication systems, such as code division multiple access (CDMA), time division multiple access TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for illustration purposes, and NR terms are used in most of the following descriptions, although these technologies may also be applied to other applications than the NR system application, for example, the 6th generation (6G) communication system.

Figures 1, 2:
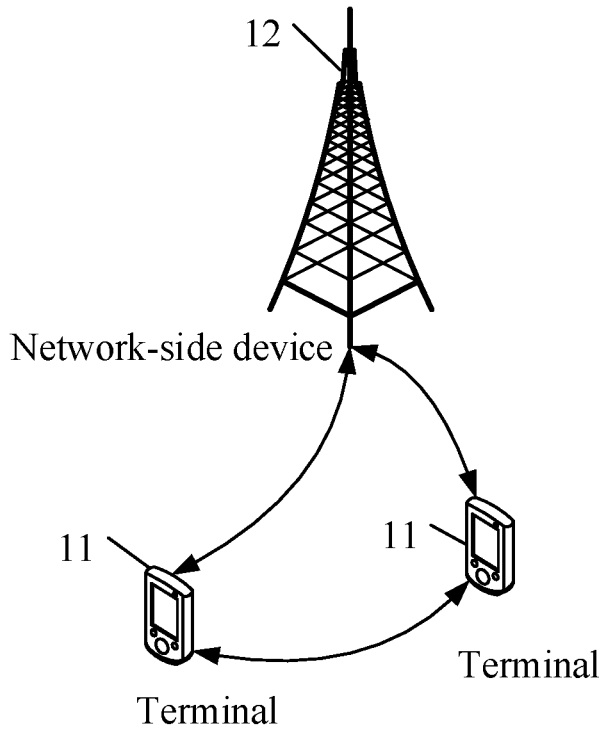
FIG. 1 is a schematic structural diagram of a wireless communications system to which embodiments of this application are applicable.
FIG. 2 is a schematic flowchart of a reference signal configuration method according to an embodiment of this application.

FIG. 1 is a schematic structural diagram of a wireless communications system to which embodiments of this application are applicable. The wireless communications system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a net-book, an ultra-mobile personal computer (UMPC), a mobile internet device (MID), a wearable device, vehicular user equipment (VUE), or pedestrian user equipment (PUE). The wearable device includes a wrist band, earphones, glasses, or the like. It should be noted that the terminal 11 is not limited to any particular type in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

With reference to the accompanying drawings, the following describes in detail the reference signal configuration provided in embodiments of this application through specific embodiments and application scenarios thereof.

FIG. 2 is a schematic flowchart of a reference signal configuration method according to an embodiment of this application. This method can be executed by a terminal, meaning this method can be executed by software or hardware installed on the terminal. As shown in FIG. 2, the method may include the following steps.

Step S201: Determine a first configuration of a first reference signal and/or a first configuration state of the first configuration when the terminal is in an idle or inactive state, where the first configuration state includes at least one of the following: valid, available, activated, invalid, unavailable, and deactivated.

In this embodiment of this application, when the terminal is in an idle or inactive state, the terminal can use various manners to determine the first configuration of the first reference signal, that is, to determine a configuration for use by the terminal. The first configuration may be a received configuration or one configuration selected from multiple configurations already available for the first reference signal of the terminal.

In addition, the terminal may further determine the first configuration state of the first configuration, that is, to determine whether the first configuration is valid, available, or activated.

The first reference signal is a reference signal configured by the network for connected-state UE.

In addition, the connected-state UE and the idle/inactive UE can be the same or different. In other words, the network may configure for an idle/inactive-state terminal a reference signal configuration made when that terminal is in a connected state, or configure for the terminal a reference signal configuration made for another terminal when the another terminal is in a connected state or a reference signal configuration made by the network under a connected state which is not meant for any specific terminal.

The first reference signal includes at least one of the following: a channel state information reference signal (CSI-RS), a demodulation reference signal (DMRS), a tracking reference signal (TRS), a positioning reference signal (PRS), and a second synchronization signal and PBCH block (SSB), where the second synchronization signal and PBCH block is different from a first synchronization signal and PBCH block received by an idle-state terminal. As above, in this embodiment of this application, the first configuration of the first reference signal and/or the first configuration state of the first configuration is determined when the terminal is in an idle or inactive state. Thus, an idle/inactive-state terminal is able to use a reference signal for a connected state.

FIG. 3 is another schematic flowchart of a reference signal configuration method according to an embodiment of this application. This method can be executed by a terminal, meaning this method can be executed by software or hardware installed on the terminal. As shown in FIG. 3, the method may include the following steps.

Step S301: Release a radio resource control (RRC) connected state to enter an idle state or suspend an RRC connected state to enter an inactive state.

After switching from a connected state to an idle or inactive state, the terminal can use various manners to determine the first configuration of the first reference signal and/or the first configuration state of the first configuration.

Step S302: Determine the first configuration of the first reference signal and/or the first configuration state of the first configuration when the terminal is in an idle or inactive state, according to at least one of the following target indications, where the target indications include: an early indication signal indication, a paging message indication, an RRC message indication, and a system information (SI) indication.

It should be understood that the first reference signal is a reference signal configured by the network for connected-state UE. The first reference signal includes at least one of the following: a channel state information reference signal, a demodulation reference signal, a tracking reference signal, a positioning reference signal, and a second synchronization signal and PBCH block, where the second synchronization signal and PBCH block is different from a first synchronization signal and PBCH block received by an idle-state terminal.

In an implementation, the terminal may determine the first configuration of the first reference signal and/or the first configuration state of the first configuration based on an early indication signal indication obtained. In other words, bits in the early indication signal indication are used to indicate the validity, availability, or activation state of the first configuration of the first reference signal, or bits in the early indication signal indication are used to indicate which configuration is used for the first reference signal. The early indication signal includes at least one of the following: a wake-up signal (WUS), a go-to-sleep signal (GTS), downlink control information with CRC scrambled by PS-RNTI (DCP), a paging response, a paging indication, and a paging early indication (PEI).

In another implementation, the terminal may determine the first configuration of the first reference signal and/or the first configuration state of the first configuration based on a paging message indication obtained. In other words, bits in the paging message indication are used to indicate the validity, availability, or activation state of the first configuration of the first reference signal. The paging message includes at least one of the following: downlink control information corresponding to paging (paging DCI), physical downlink control channel corresponding to paging (paging PDCCH), physical downlink shared channel corresponding to paging (paging PDSCH), and a short message.

In another implementation, the terminal may determine the first configuration of the first reference signal and/or the first configuration state of the first configuration based on an RRC message indication obtained. In other words, bits in the RRC message are used to indicate the validity, availability, or activation state of the first configuration of the first reference signal. The RRC message includes at least one of the following: RRC release, RRC suspend, RRC configuration for connected state, and RRC reconfiguration for connected state.

In another implementation, the terminal may determine the first configuration of the first reference signal and/or the first configuration state of the first configuration based on an SI message indication obtained. In other words, bits in the SI message are used to indicate the validity, availability, or activation state of the first configuration of the first reference signal.

In an implementation, the target indication is further used for determining at least one of when the first configuration of the first reference signal is valid, available, activated, invalid, unavailable, and deactivated.

In an implementation, in a case that the first configuration is a first reference signal configuration configured by a network side under the connected state, the target indication is further used to indicate that the first configuration state of the first configuration is to be effective. The target indication is used to indicate that the first configuration state configured by the network side under the connected state for the terminal continues to be valid, available, or activated.

In an implementation, the first configuration state of the first configuration is effective upon receipt of the target indication.

In an implementation, in a case that the first reference signal has multiple configurations, the terminal may determine the first configuration of the first reference signal from the multiple configurations according to the target indication. Specifically, the terminal uses one or multiple bits in the target indication message to indicate which configuration of the first reference signal is to be used, or indicate which configuration of the first reference signal is available, valid, or activated.

The multiple configurations of the reference signal mean different values are assigned for some or all parameters of the reference signal. For example, the configuration of the reference signal has several parameters, some or all of which have different values.

Specifically, the multiple configurations may be configured through the above-mentioned one message or multiple messages. In the case of multiple configurations being configured through multiple messages, some of the messages may be used to each configure one configuration and some to each configure multiple configurations.

In an implementation, before the determining a first configuration of a first reference signal, the method further includes:

configuring at least one configuration of the first reference signal according to at least one of the following configuration manners, where the configuration manners include:

system information;

early indication signal;

paging message, including paging DCI, paging PDSCH, short message, and the like; and RRC message, including RRC configuration message, RRC reconfiguration message, RRC release message, and RRC suspend message.

The RRC reconfiguration message includes at least one of the following: reconfiguration (or reconfiguration without sync), handover command, mobility control info, and reconfiguration with sync.

The configuring through RRC configuration or RRC reconfiguration specifically means that the terminal can continue to use in an idle/inactive state a reference signal configuration that is configured by the network when the terminal is in a connected state, according to network indication or protocol specification. The configuring through RRC release or RRC suspend specifically refers to a reference signal configuration configured by the network for the terminal when the terminal is released to an idle state or suspended to an inactive state.

The multiple configurations of the first reference signal of the terminal can be configured using one or more of the foregoing configuration manners. The multiple configurations of the first reference signal mean that some or all parameter fields of the first reference signal are configured with multiple configuration parameters. The transmitting, sending, and configuring the first reference signal to the terminal refer to transmitting, sending, and configuring resources or resource sets for the first reference signal to the terminal.

As above, in this embodiment of this application, the obtained target indication is used for determining the first configuration of the first reference signal and/or the first configuration state of the first configuration. Thus, an idle/inactive-state terminal is able to use a reference signal for the connected state and make flexible configuration.

FIG. 4 is still another schematic flowchart of a reference signal configuration method according to an embodiment of this application. This method can be executed by a terminal, meaning this method can be executed by software or hardware installed on the terminal. As shown in FIG. 4, the method may include the following steps.

Step S401: Determine a first configuration of a first reference signal and/or a first configuration state of the first configuration when the terminal is in an idle or inactive state, where the first configuration state of the first configuration becomes effective upon receipt of the first configuration of the first reference signal. The first configuration state may be valid, available, activated, invalid, unavailable, or deactivated.

It should be understood that the first reference signal is a reference signal configured by the network for connected-state UE. The first reference signal includes at least one of the following: a channel state information reference signal, a demodulation reference signal, a tracking reference signal, a positioning reference signal, and a second synchronization signal and PBCH block, where the second synchronization signal and PBCH block is different from a first synchronization signal and PBCH block received by an idle-state terminal.

It should be understood that after the terminal has obtained the first configuration of the first reference signal, the first configuration state of the first configuration may be set to be valid/available/activated, or the first configuration state of the first configuration may be set to be invalid/unavailable/deactivated.

In an implementation of the first configuration state being valid/available/activated, in a case that the first configuration of the first reference signal is configured through the RRC release or RRC suspend message, the first configuration state of the first configuration becomes valid/available/activated upon receipt of the first configuration of the first reference signal.

In another implementation of the first configuration state being valid/available/activated, after the terminal has obtained the first configuration of the first reference signal, the first configuration state of the first configuration ends when at least one of first conditions is met. Specifically, the determined first configuration state of the first reference signal lasts until at least one of the first conditions is met.

The first condition includes one of the following:

a first predetermined timer has expired, where the first configuration state remains valid/available/activated until the first predetermined timer has expired, and a threshold of the first predetermined timer can be configured by the network or specified in a protocol;

a first preset duration has elapsed, where the first configuration state remains valid/available/activated until the state lasts longer than the first preset duration, and the first preset duration can be configured by the network or specified by a protocol;

a target indication for indicating the first configuration state of the first configuration has been received, where the first configuration state remains valid/available/activated until the terminal obtains a next target indication that indicates the first configuration state being valid/available/activated or a next target indication that indicates the first configuration state being invalid/unavailable/deactivated; and the target indication may be the same target indication as described in Step S302 in FIG. 3, or other indications; and a second configuration of the first reference signal has been received, where the second configuration is partially or totally different from the first configuration, for example, the first reference signal has several parameters while some or all parameters in the second configuration have different values than those in the first configuration; and the first configuration state remains valid/available/activated until the terminal obtains a new configuration of the first reference signal.

In an implementation of the first configuration state being invalid/unavailable/deactivated, in a case that the first configuration of the first reference signal is configured through the RRC release or RRC suspend message, the first configuration state of the first configuration becomes invalid/unavailable/deactivated upon receipt of the first configuration of the first reference signal.

In another implementation of the first configuration state being invalid/unavailable/deactivated, after the terminal has obtained the first configuration of the first reference signal, the first configuration state of the first configuration ends when at least one of first conditions is met.

The first condition includes one of the following:

a first predetermined timer has expired, where the first configuration state remains invalid/unavailable/deactivated until the first predetermined timer has expired, and a threshold of the first predetermined timer can be configured by the network or specified in a protocol;

a first preset duration has elapsed, where the first configuration state remains invalid/unavailable/deactivated until the first preset duration has elapsed, and the first preset duration can be configured by the network or specified in a protocol;

a target indication for indicating the first configuration state of the first configuration has been received, where the first configuration state remains invalid/unavailable/deactivated until the terminal obtains a next target indication that indicates the first configuration state being valid/available/activated or a next target indication that indicates the first configuration state being invalid/unavailable/deactivated; and the target indication may be the same target indication as described in Step S302 in FIG. 3, or other indications; and a second configuration of the first reference signal has been received, where the second configuration is partially or totally different from the first configuration; and the first configuration state remains invalid/unavailable/deactivated until the terminal obtains a new configuration of the first reference signal.

During the switching of the first reference signal from the first configuration to the second configuration, in an implementation, the terminal may replace the entire first configuration of the first reference signal with the second configuration. If parameter X is configured in both configurations, Xa being in the first configuration and Xb being in the second configuration, parameter X needs to be changed from Xa to Xb; if parameter Y of the first reference signal is only configured in the first configuration as Ya but not configured in the second configuration, the first reference signal has no configuration of parameter Y after the switching; and if parameter Z is not configured in the first configuration but configured in the second configuration as Zb, parameter Z is configured as Zb after the switching.

In another implementation, the first configuration of the first reference signal can be partially replaced with the second configuration. If parameter X is configured in both configurations, Xa being in the first configuration and Xb being in the second configuration, parameter X needs to be changed from Xa to Xb; if parameter Y of the first reference signal is only configured in the first configuration as Ya but not configured in the second configuration, parameter Y in the first reference signal continues to be configured as Ya after the switching; and if parameter Z is not configured in the first configuration but configured in the second configuration as Zb, parameter Z is configured as Zb after the switching.

As above, in this embodiment of this application, the first configuration state of the first configuration becomes effective upon receipt of the first configuration of the first reference signal. Thus, an idle/inactive-state terminal is able to use a reference signal for a connected state and make flexible configuration, saving electric power.

FIG. 5 is yet another schematic flowchart of a reference signal configuration method according to an embodiment of this application. This method can be executed by a terminal, meaning this method can be executed by software or hardware installed on the terminal. As shown in FIG. 5, the method may include the following steps.

Step S501: Determine a first configuration of a first reference signal and/or a first configuration state of the first configuration when the terminal is in an idle or inactive state.

The first configuration of the first reference signal is a configuration made by the network side for a first reference signal of the terminal being in a connected state.

Step S502: The first configuration state of the first configuration becomes effective when the terminal is released to an idle state or suspended to an inactive state.

It should be understood that the first reference signal is a reference signal configured by the network for connected-state UE. The first reference signal includes at least one of the following: a channel state information reference signal, a demodulation reference signal, a tracking reference signal, a positioning reference signal, and a second synchronization signal and PBCH block, where the second synchronization signal and PBCH block is different from a first synchronization signal and PBCH block received by an idle-state terminal.

In an implementation, in a case that the first configuration of the first reference signal is configured by the network side for the terminal when the terminal is in a connected state, the first configuration state of the first configuration becomes effective when the terminal is released to an idle state or suspended to an inactive state. The first configuration state may be valid/available/active or invalid/unavailable/deactivated.

In an implementation, in a case that the first configuration of the first reference signal is configured by the network side for the terminal when the terminal is in a connected state, the first configuration state of the first configuration continues to be valid/available/activated when the terminal is released to an idle state or suspended to an inactive state; or, the first configuration state of the first configuration ends to be valid/available/activated when the terminal is released to an idle state or suspended to an inactive state and at least one of second conditions is met.

The second condition includes one of the following:

a second predetermined timer has expired, where the first configuration state remains valid/available/activated until the second predetermined timer has expired, and a threshold of the second predetermined timer can be configured by the network or specified in a protocol;

a second preset duration has elapsed, where the first configuration state remains invalid/unavailable/deactivated until the second preset duration expires, and the second preset duration can be configured by the network or specified in a protocol;

a target indication for indicating the first configuration state of the first configuration has been received, where the first configuration state remains valid/available/activated until the terminal obtains a next target indication that indicates the first configuration state being valid/available/activated or a next target indication that indicates the first configuration state being invalid/unavailable/deactivated; and the target indication may be the same target indication as described in Step S302 in FIG. 3, or other indications; and a second configuration of the first reference signal has been received, where the second configuration is partially or totally different from the first configuration; and the first configuration state remains valid/available/activated until the terminal obtains a new configuration of the first reference signal.

In another implementation, in a case that the first configuration of the first reference signal is configured by the network side for the terminal when the terminal is in a connected state, the first configuration state of the first configuration becomes invalid/unavailable/deactivated when the terminal is released to an idle state or suspended to an inactive state; or the first configuration state of the first configuration ends to be invalid/unavailable/deactivated when the terminal is released to an idle state or suspended to an inactive state and at least one of second conditions is met.

The second condition includes one of the following:

a second predetermined timer has expired, where the first configuration state remains invalid/unavailable/deactivated until the second predetermined timer has expired, and a threshold of the second predetermined timer can be configured by the network or specified in a protocol;

a second preset duration has elapsed, where the first configuration state remains invalid/unavailable/deactivated until the first preset duration has elapsed, and the first preset duration can be configured by the network or specified in a protocol;

a target indication for indicating the first configuration state of the first configuration has been received, where the first configuration state remains invalid/unavailable/deactivated until the terminal obtains a next target indication that indicates the first configuration state being valid/available/activated or a next target indication that indicates the first configuration state being invalid/unavailable/deactivated; and the target indication may be the same target indication as described in Step S302 in FIG. 3, or other indications; and a second configuration of the first reference signal has been received, where the second configuration is partially or totally different from the first configuration; and the first configuration state remains invalid/unavailable/deactivated until the terminal obtains a new configuration of the first reference signal.

As above, in this embodiment of this application, in the case that the first configuration of the first reference signal is a configuration made by the network side for a first reference signal of the terminal being in a connected state, the first configuration state of the first configuration becomes effective when the terminal is released to an idle state or suspended to an inactive state. Thus, an idle/inactive-state terminal is able to use a reference signal for a connected state and make flexible configuration, saving electric power.

It should be noted that, the reference signal configuration method provided in embodiments of this application may be performed by a reference signal configuration apparatus or a control module in a reference signal configuration apparatus for executing the reference signal configuration method. In embodiments of this application, the reference signal configuration method being executed by a reference signal configuration apparatus is used as an example to describe the reference signal configuration apparatus provided in embodiments of this application.

Figure 6:
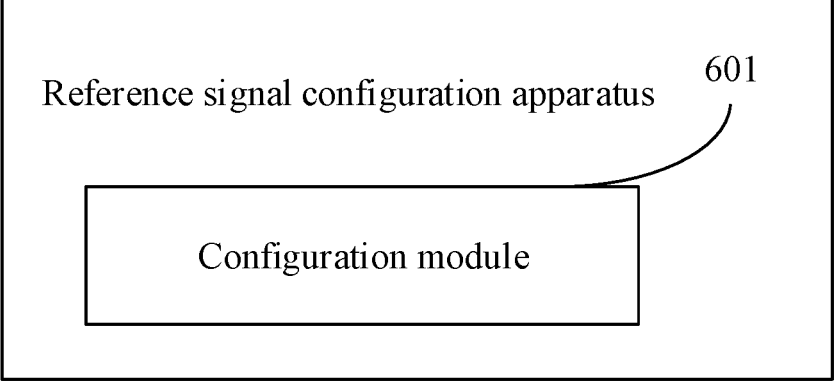
FIG. 6 is a schematic structural diagram of a reference signal configuration apparatus according to an embodiment of this application.

FIG. 6 is schematic structural diagram of a reference signal configuration apparatus according to an embodiment of this application. As shown in FIG. 6, the apparatus includes a configuration module 601.

The configuration module 601 is configured to determine a first configuration of a first reference signal and/or a first configuration state of the first configuration when a terminal is in an idle or inactive state, where the first configuration state includes at least one of the following: valid, available, activated, invalid, unavailable, and deactivated.

Optionally, the configuration module 601 may include a first configuration unit configured to determine the first configuration of the first reference signal when the terminal is in an idle or inactive state; and a second configuration unit configured to determine a first configuration state of the first configuration when the terminal is in an idle or inactive state.

As above, in this embodiment of this application, the first configuration of the first reference signal and/or the first configuration state of the first configuration is determined when the terminal is in an idle or inactive state. Thus, an idle/inactive-state terminal is able to use a reference signal for a connected state.

Further, the apparatus further includes:

a state module configured to release a radio resource control (RRC) connected state to enter an idle state or suspend an RRC connected state to enter an inactive state.

Further, the configuration module is configured to determine the first configuration of the first reference signal and/or the first configuration state of the first configuration when the terminal is in an idle or inactive state, according to at least one of the following target indications, where the target indications include: an early indication signal indication, a paging message indication, an RRC message indication, and a system information indication.

Further, the early indication signal includes at least one of the following: a wake-up signal, a go-to-sleep signal, a paging response, a paging indication, and a paging early indication; or the paging message includes at least one of the following: a PDCCH corresponding to paging, a PDSCH corresponding to paging, and a short message; or the RRC message includes at least one of the following: RRC release, RRC suspend, RRC configuration for connected state, and RRC reconfiguration for connected state.

Further, the target indication is further used for determining at least one of when the first configuration of the first reference signal is valid, available, activated, invalid, unavailable, and deactivated.

Further, in a case that the first configuration is a first reference signal configuration configured by a network side under the connected state, the target indication is further used to indicate that a first configuration state of the first configuration is to be effective.

Therefore, in this embodiment of this application, the obtained target indication is used for determining the first configuration of the first reference signal and/or the first configuration state of the first configuration, so that an idle/inactive-state terminal is able to use a reference signal for a connected state and make flexible configuration.

Further, the first configuration state of the first configuration becomes effective upon receipt of the target indication.

Further, the configuration module is further configured to determine, in a case that the first reference signal has multiple configurations, the first configuration of the first reference signal from the multiple configurations.

Further, the first configuration state of the first configuration becomes effective upon receipt of the first configuration of the first reference signal.

Further, the configuration module is further configured in a way that the first configuration state of the first configuration ends when at least one of first conditions is met.

The first condition includes one of the following:

a first predetermined timer has expired;

a first preset duration has elapsed;

a target indication for indicating the first configuration state of the first configuration has been received; and a second configuration of the first reference signal has been received, where the second configuration is partially or totally different from the first configuration.

Further, the configuration module is configured in a way that the first configuration state of the first configuration becomes effective upon receipt of the first configuration of the first reference signal in a case that the first configuration of the first reference signal is configured through an RRC release or RRC suspend message.

As above, in this embodiment of this application, the first configuration state of the first configuration becomes effective upon receipt of the first configuration of the first reference signal. Thus, an idle/inactive-state terminal is able to use a reference signal for a connected state and make flexible configuration, saving electric power.

Further, the first configuration of the first reference signal is a configuration made by the network side for a first reference signal of the terminal being in a connected state.

Further, the configuration module is configured in a way that the first configuration state of the first configuration becomes effective when the terminal is released to an idle state or suspended to an inactive state.

Further, the configuration module is further configured in a way that the first configuration state of the first configuration ends when at least one of second conditions is met.

The second condition includes one of the following:

a second predetermined timer has expired;

a second preset duration has elapsed;

a target indication for indicating the first configuration state of the first configuration has been received; and a second configuration of the first reference signal has been received, where the second configuration is partially or totally different from the first configuration.

Further, the first reference signal is a reference signal configured by network for connected-state UE.

Further, the first reference signal includes at least one of the following: a channel state information reference signal, a demodulation reference signal, a tracking reference signal, a positioning reference signal, and a second synchronization signal and PBCH block, where the second synchronization signal and PBCH block is different from a first synchronization signal and PBCH block received by an idle-state terminal.

Further, the apparatus further includes:

a receiving module, configured to configure at least one configuration of the first reference signal according to at least one of the following configuration manners, where the configuration manners include:

system information;

early indication signal;

paging message; and

RRC message.

As above, in this embodiment of this application, in the case that the first configuration of the first reference signal is a configuration made by the network side for a first reference signal of the terminal being in a connected state, the first configuration state of the first configuration becomes effective when the terminal is released to an idle state or suspended to an inactive state. Thus, an idle/inactive-state terminal is able to use a reference signal for a connected state and make flexible configuration, saving electric power.

The reference signal configuration apparatus in this embodiment of this application may be an apparatus or a component, integrated circuit, or chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in the embodiments of this application.

The reference signal configuration apparatus in this embodiment of this application may be an apparatus with an operating system. The operating system may be an Android operating system, an iOS operating system, or other possible operating systems. This is not specifically limited in embodiments of this application.

The reference signal configuration apparatus provided in this embodiment of this application can implement the processes implemented in the method embodiments of FIG. 2 to FIG. 5 with the same technical effects achieved. To avoid repetition, details are not described herein again.

Figure 7:
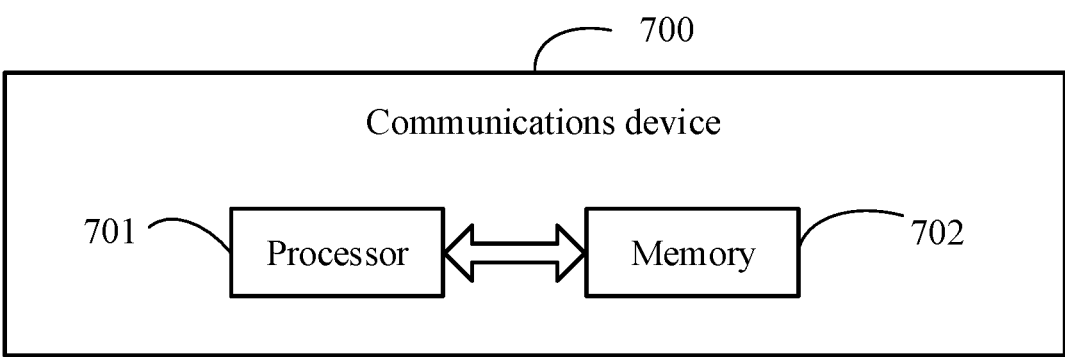
FIG. 7 is a schematic structural diagram of a communications device according to an embodiment of this application.

Optionally, as shown in FIG. 7, an embodiment of this application further provides a communications device 700 including a processor 701, a memory 702, and a program or instructions stored in the memory 702 and capable of running on the processor 701. For example, when the communications device 700 is a terminal, the program or instructions are executed by the processor 701 to implement the processes of the reference signal configuration method embodiment, with the same technical effects achieved. In a case that the communications device 700 is a network-side device, the program or instructions are executed by the processor 701 to implement the processes of the foregoing reference signal configuration method embodiment, with the same technical effects achieved. To avoid repetition, details are not described herein again.

Figure 8:
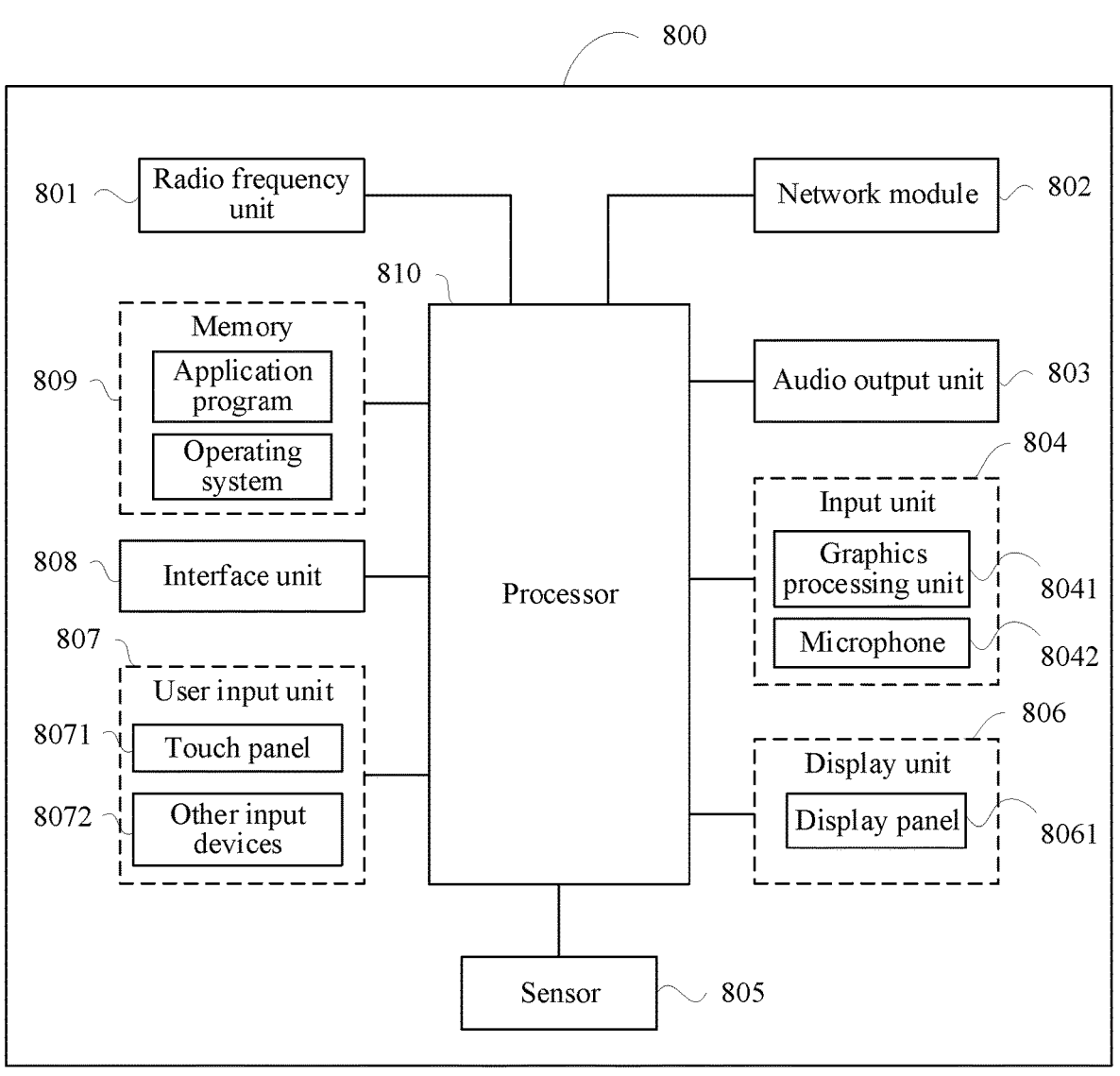
FIG. 8 is a schematic diagram of a hardware structure of a terminal for implementing embodiments of this application.

FIG. 8 is a schematic diagram of a hardware structure of a terminal for implementing embodiments of this application.

The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

Persons skilled in the art can understand that the terminal 800 may further include a power supply (for example, battery) for supplying power to the components. The power supply may be logically connected to the processor 810 via a power management system, so that functions such as charge management, discharge management, and power consumption management are implemented via the power management system. The terminal structure shown in FIG. 8 does not constitute any limitation on the terminal. The terminal may include more or fewer components than shown in the figure, or combine some of the components, or arrange the components differently. Details are not described herein.

It should be understood that in this embodiment of this application, the input unit 804 may include a graphics processing unit (GPU) 8041 and a microphone 8042. The graphics processing unit 8041 processes image data of a static picture or video that is obtained by an image capture apparatus (for example, camera) in a image or video capture mode. The display unit 806 may include a display panel 8061, and the display panel 8061 may be configured in a form of a liquid crystal display, an organic light-emitting diode display, or the like. The user input unit 807 includes a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function button (for example, a volume control button or a power on/off button), a trackball, a mouse, and a joystick. Details are not described herein.

In this embodiment of this application, the radio frequency unit 801 sends the downlink data received from a network-side device to the processor 810 for processing, and in addition, sends uplink data to the network-side device. Generally, the radio frequency unit 801 includes but is not limited to an antenna, at least one amplifier, a transceiver, a coupler, a low noise amplifier, a duplexer, and the like.

The memory 809 may be configured to store software programs or instructions and various data. The memory 809 may include a program or instruction storage area and a data storage area. The program or instruction storage area may store an operating system, an application program or instructions required by at least one function (for example, sound play function or image play function), and the like. In addition, the memory 809 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other non-volatile solid-state storage device.

The processor 810 may include one or more processing units. Optionally, the processor 810 may integrate an application processor and a modem processor. The application processor mainly processes an operating system, a user interface, application programs or instructions, and the like. The modem processor mainly processes wireless communication, for example, being a baseband processor. It can be understood that the modem processor may alternatively be not integrated into the processor 810.

The processor 810 is configured to determine a first configuration of a first reference signal and/or a first configuration state of the first configuration when the terminal is in an idle or inactive state, where the first configuration state includes at least one of the following: valid, available, activated, invalid, unavailable, and deactivated.

As above, in this embodiment of this application, the first configuration of the first reference signal and/or the first configuration state of the first configuration is determined when the terminal is in an idle or inactive state. Thus, an idle/inactive-state terminal is able to use a reference signal for a connected state.

Optionally, the processor 810 is further configured to release a radio resource control (RRC) connected state to enter an idle state or suspend an RRC connected state to enter an inactive state.

Optionally, the processor 810 is further configured to determine the first configuration of the first reference signal and/or the first configuration state of the first configuration when the terminal is in an idle or inactive state, according to at least one of the following target indications, where the target indications include: an early indication signal indication, a paging message indication, an RRC message indication, and a system information indication.

Optionally, the early indication signal includes at least one of the following: a wake-up signal, a go-to-sleep signal, a paging response, a paging indication, and a paging early indication; or the paging message includes at least one of the following: a PDCCH corresponding to paging, a PDSCH corresponding to paging, and a short message; or the RRC message includes at least one of the following: RRC release, RRC suspend, RRC configuration for connected state, and RRC reconfiguration for connected state.

Optionally, the target indication is further used for determining at least one of when the first configuration of the first reference signal is valid, available, activated, invalid, unavailable, and deactivated.

Optionally, the processor 810 is further configured in a way that the target indication is further used to indicate that the first configuration state of the first configuration is to be effective in a case that the first configuration is a first reference signal configuration configured by a network side under the connected state.

Optionally, the first configuration state of the first configuration becomes effective upon receipt of the target indication.

Optionally, the processor 810 is further configured to determine, in a case that the first reference signal has multiple configurations, the first configuration of the first reference signal from the multiple configurations.

As above, in this embodiment of this application, the obtained target indication is used for determining the first configuration of the first reference signal and/or the first configuration state of the first configuration. Thus, an idle/inactive-state terminal can use a reference signal for a connected state and make flexible configuration.

Optionally, the first configuration state of the first configuration becomes effective upon receipt of the first configuration of the first reference signal.

Optionally, the processor 810 is further configured in a way that the first configuration state of the first configuration ends when at least one of first conditions is met.

The first condition includes one of the following:
a first predetermined timer has expired;
a first preset duration has elapsed;
a target indication for indicating the first configuration state of the first configuration has been received; and
a second configuration of the first reference signal has been received, where the second configuration is partially or totally different from the first configuration.

Optionally, the processor 810 is configured in a way that the first configuration state of the first configuration becomes effective upon receipt of the first configuration of the first reference signal in a case that the first configuration of the first reference signal is configured through an RRC release or RRC suspend message.

As above, in this embodiment of this application, the first configuration state of the first configuration becomes effective upon receipt of the first configuration of the first reference signal. Thus, an idle/inactive-state terminal is able to use a reference signal for a connected state and make flexible configuration, saving electric power.

Optionally, the first configuration of the first reference signal is a configuration made by the network side for a first reference signal of the terminal being in a connected state.

Optionally, the processor 810 is configured in a way that the first configuration state of the first configuration becomes effective when the terminal is released to an idle state or suspended to an inactive state.

Optionally, the processor 810 is further configured in a way that the first configuration state of the first configuration ends when at least one of second conditions is met.

The second condition includes one of the following:
a second predetermined timer has expired;
a second preset duration has elapsed;

a target indication for indicating the first configuration state of the first configuration has been received; and
a second configuration of the first reference signal has been received, where the second configuration is partially or totally different from the first configuration.

Optionally, the first reference signal is a reference signal configured by network for connected-state UE.

Optionally, the first reference signal includes at least one of the following: a channel state information reference signal, a demodulation reference signal, a tracking reference signal, a positioning reference signal, and a second synchronization signal and PBCH block, where the second synchronization signal and PBCH block is different from a first synchronization signal and PBCH block received by an idle-state terminal.

Optionally, the radio frequency unit 801 is configured to configure at least one configuration of the first reference signal according to at least one of the following configuration manners, where
the configuration manners include:
system information;
early indication signal;
paging message; and
RRC message.

As above, in this embodiment of this application, in the case that the first configuration of the first reference signal is a configuration made by the network side for a first reference signal of the terminal being in a connected state, the first configuration state of the first configuration becomes effective when the terminal is released to an idle state or suspended to an inactive state. Thus, an idle/inactive-state terminal is able to use a reference signal for a connected state and make flexible configuration, saving electric power.

An embodiment of this application further provides a readable storage medium, where the readable storage medium stores a program or instructions, and when the program or instructions are executed by a processor, the processes of the embodiments of the foregoing reference signal configuration method are implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions of a network-side device, to implement the processes of the reference signal configuration method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

Embodiments of this application have been described with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A reference signal configuration method, executed by a terminal and comprising:

determining a first configuration state of a first configuration of a first reference signal when the terminal is in an idle or inactive state, wherein the first configuration state comprises at least one of the following: valid, available, activated, invalid, unavailable, and deactivated;

wherein the determining a first configuration state of a first configuration of a first reference signal when the terminal is in an idle or inactive state comprises:

determining the first configuration state of the first configuration when the terminal is in an idle or inactive state, according to target indication, wherein the target indication comprises an early indication signal indication.

2. The method according to claim 1, wherein before the determining a first configuration state of a first configuration of a first reference signal, the method further comprises:

releasing a radio resource control (RRC) connected state to enter the idle state; or suspending an RRC connected state to enter the inactive state.

3. The method according to claim 1, wherein the early indication signal comprises at least one of the following: a wake-up signal, a go-to-sleep signal, a paging response, a paging indication, and a paging early indication.

4. The method according to claim 1, wherein the target indication is further used for determining at least one of when the first configuration of the first reference signal is valid, available, activated, invalid, unavailable, and deactivated.

5. The method according to claim 1, wherein in a case that the first configuration is a first reference signal configuration configured by a network side under the connected state, the target indication is further used to indicate that the first configuration state of the first configuration is to be effective.

6. The method according to claim 1, wherein the first configuration state of the first configuration becomes effective upon receipt of the target indication.

7. The method according to claim 1, wherein the first configuration state of the first configuration becomes effective upon receipt of the first configuration of the first reference signal.

8. The method according to claim 7, wherein the first configuration state of the first configuration ends when a first condition is met, wherein the first condition comprises at least one of the following:

a first predetermined timer has expired;

a first preset duration has elapsed;

a target indication for indicating the first configuration state of the first configuration has been received; and a second configuration of the first reference signal has been received, wherein the second configuration is partially or totally different from the first configuration.

9. The method according to claim 7, wherein in a case that the first configuration of the first reference signal is configured through an RRC release or RRC suspend message, the first configuration state of the first configuration becomes effective upon receipt of the first configuration of the first reference signal.

10. The method according to claim 1, wherein the first configuration of the first reference signal is a configuration made by the network side for a first reference signal of the terminal being in an RRC connected state.

11. The method according to claim 10, wherein the determining a first configuration state of a first configuration of a first reference signal when the terminal is in an idle or inactive state comprises:

the first configuration state of the first configuration becomes effective when the terminal is released to an idle state or suspended to an inactive state.

12. The method according to claim 10, wherein the first configuration state of the first configuration ends when a second condition is met, wherein the second condition comprises at least one of the following:

a second predetermined timer has expired;

a second preset duration has elapsed;

a target indication for indicating the first configuration state of the first configuration has been received; and a second configuration of the first reference signal has been received, wherein the second configuration is partially or totally different from the first configuration.

13. The method according to claim 1, wherein the first reference signal is a reference signal configured by a network for connected-state UE.

14. The method according to claim 13, wherein the first reference signal comprises at least one of the following: a channel state information reference signal, a demodulation reference signal, a tracking reference signal, a positioning reference signal, and a second synchronization signal and PBCH block, wherein the second synchronization signal and PBCH block is different from a first synchronization signal and PBCH block received by an idle-state terminal.

15. A terminal, comprising a processor, a memory, and a program or instructions stored in the memory and run on the processor, wherein the program or instructions are executed by the processor to perform:

determining a first configuration state of a first configuration of a first reference signal when the terminal is in an idle or inactive state, wherein the first configuration state comprises at least one of the following: valid, available, activated, invalid, unavailable, and deactivated;

wherein the determining a first configuration state of a first configuration of a first reference signal when the terminal is in an idle or inactive state comprises:

determining the first configuration state of the first configuration when the terminal is in an idle or inactive state, according to target indication, wherein the target indication comprises an early indication signal indication.

16. A readable storage medium, wherein the readable storage medium stores a program or instructions, and the program or the instructions are executed by a processor to perform:

determining a first configuration state of a first configuration of a first reference signal when the terminal is in an idle or inactive state, wherein the first configuration state comprises at least one of the following: valid, available, activated, invalid, unavailable, and deactivated;

wherein the determining a first configuration state of a first configuration of a first reference signal when the terminal is in an idle or inactive state comprises:

determining the first configuration state of the first configuration when the terminal is in an idle or inactive state, according to target indication, wherein the target indication comprises an early indication signal indication.

* * * * *